(12) United States Patent
Roberts

(10) Patent No.: US 7,167,857 B2
(45) Date of Patent: *Jan. 23, 2007

(54) METHOD AND SYSTEM FOR FINDING APPROXIMATE MATCHES IN DATABASE

(75) Inventor: Dale T. Roberts, San Anselmo, CA (US)

(73) Assignee: Gracenote, Inc., Emeryville, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 10/281,948

(22) Filed: Oct. 29, 2002

(65) Prior Publication Data

US 2003/0046283 A1  Mar. 6, 2003

Related U.S. Application Data

(60) Division of application No. 09/820,722, filed on Mar. 30, 2001, which is a continuation of application No. 09/354,166, filed on Jul. 16, 1999, now Pat. No. 6,230,192, which is a division of application No. 08/838,082, filed on Apr. 15, 1997, now Pat. No. 5,987,525.

(51) Int. Cl.
*G06F 17/30* (2006.01)

(52) U.S. Cl. .............................. 707/3; 707/10; 709/217; 709/232

(58) Field of Classification Search .................... 707/3, 707/4, 10; 709/217, 232; 711/108
See application file for complete search history.

(56) References Cited

U.S. PATENT DOCUMENTS

| 4,488,179 A | 12/1984 | Krüger et al. |
| 4,641,205 A | 2/1987 | Beyers, Jr. |
| 4,870,568 A | 9/1989 | Kahle et al. |
| 5,113,383 A | 5/1992 | Amemiya et al. |
| 5,132,949 A | 7/1992 | Choi |
| 5,157,614 A | 10/1992 | Kashiwazaki et al. |
| 5,157,646 A | 10/1992 | Amemiya et al. |
| 5,206,949 A * | 4/1993 | Cochran et al. ............... 707/4 |
| 5,210,734 A | 5/1993 | Sakurai |
| 5,237,157 A | 8/1993 | Kaplan |

(Continued)

FOREIGN PATENT DOCUMENTS

EP  0 194 143 A2  9/1986

(Continued)

OTHER PUBLICATIONS

USMARC Format for Bibliographic Data - Update No. 2, Library of Congress, Mar. 1996.

(Continued)

*Primary Examiner*—Don Wong
*Assistant Examiner*—Sheree Brown
(74) *Attorney, Agent, or Firm*—Staas & Halsey LLP

(57) ABSTRACT

Entertainment content complementary to a musical recording is delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

47 Claims, 3 Drawing Sheets

U.S. PATENT DOCUMENTS

| | | |
|---|---|---|
| 5,263,010 A | 11/1993 | Amemiya et al. |
| 5,341,350 A | 8/1994 | Frank et al. |
| 5,388,259 A | 2/1995 | Fleischman et al. |
| 5,392,264 A | 2/1995 | Hira |
| 5,410,543 A | 4/1995 | Seitz et al. |
| 5,414,684 A | 5/1995 | Nonaka et al. |
| 5,430,698 A | 7/1995 | Nonaka et al. |
| 5,446,714 A | 8/1995 | Yoshio et al. |
| 5,446,891 A | 8/1995 | Kaplan et al. |
| 5,463,605 A | 10/1995 | Nishida et al. |
| 5,464,946 A | 11/1995 | Lewis |
| 5,465,240 A | 11/1995 | Mankovitz |
| 5,475,835 A | 12/1995 | Hickey |
| 5,488,725 A | 1/1996 | Turtle et al. |
| 5,544,139 A | 8/1996 | Aramaki et al. |
| 5,559,764 A | 9/1996 | Chen et al. |
| 5,559,949 A | 9/1996 | Reimer et al. |
| 5,583,560 A | 12/1996 | Florin et al. |
| 5,584,025 A | 12/1996 | Keithley et al. |
| 5,615,345 A | 3/1997 | Wanger |
| 5,625,608 A | 4/1997 | Grewe et al. |
| 5,642,337 A | 6/1997 | Oskay et al. |
| 5,649,114 A | 7/1997 | Deaton et al. |
| 5,659,732 A | 8/1997 | Kirsch |
| 5,673,322 A | 9/1997 | Pepe et al. |
| 5,679,911 A | 10/1997 | Moriyama et al. |
| 5,680,379 A | 10/1997 | Ishida et al. |
| 5,689,484 A | 11/1997 | Hirasawa |
| 5,691,964 A | 11/1997 | Niederlein et al. |
| 5,694,162 A | 12/1997 | Freeny, Jr. |
| 5,694,546 A | 12/1997 | Reisman |
| 5,701,385 A | 12/1997 | Katsuyama et al. |
| 5,703,795 A | 12/1997 | Mankovitz |
| 5,721,827 A | 2/1998 | Logan et al. |
| 5,726,957 A | 3/1998 | Hisamatsu et al. |
| 5,727,129 A | 3/1998 | Barrett et al. |
| 5,740,304 A | 4/1998 | Katsuyama et al. |
| 5,740,549 A | 4/1998 | Reilly et al. |
| 5,745,681 A | 4/1998 | Levine et al. |
| 5,751,672 A | 5/1998 | Yankowski |
| 5,751,956 A | 5/1998 | Kirsch |
| 5,754,784 A | 5/1998 | Garland et al. |
| 5,757,739 A | 5/1998 | Heath et al. |
| 5,761,606 A | 6/1998 | Wolzien |
| 5,761,649 A | 6/1998 | Hill |
| 5,768,222 A | 6/1998 | Hisamatsu et al. |
| 5,774,431 A | 6/1998 | Bos et al. |
| 5,774,664 A * | 6/1998 | Hidary et al. ............... 725/110 |
| 5,774,666 A | 6/1998 | Portuesi |
| 5,778,181 A | 7/1998 | Hidary et al. |
| 5,778,187 A | 7/1998 | Monteiro et al. |
| 5,781,889 A | 7/1998 | Martin et al. |
| 5,781,897 A * | 7/1998 | Chen et al. ................... 707/3 |
| 5,781,909 A | 7/1998 | Logan et al. |
| 5,782,692 A | 7/1998 | Stelovsky |
| 5,793,726 A | 8/1998 | Nagano |
| 5,793,980 A | 8/1998 | Glaser et al. |
| 5,796,393 A | 8/1998 | MacNaughton et al. |
| 5,796,945 A | 8/1998 | Tarabella |
| 5,796,952 A | 8/1998 | Davis et al. |
| 5,809,250 A | 9/1998 | Kisor |
| 5,809,512 A | 9/1998 | Kato |
| 5,815,471 A | 9/1998 | Mince et al. |
| 5,822,216 A | 10/1998 | Satchell, Jr. et al. |
| 5,822,283 A | 10/1998 | Bos et al. |
| 5,822,436 A | 10/1998 | Rhoads |
| 5,826,267 A | 10/1998 | McMillan |
| 5,835,914 A | 11/1998 | Brim |
| 5,838,910 A | 11/1998 | Domenikos et al. |
| 5,848,427 A | 12/1998 | Hyodo |
| 5,893,910 A | 4/1999 | Martineau et al. |
| 5,894,554 A | 4/1999 | Lowery et al. |
| 5,903,816 A | 5/1999 | Broadwin et al. |
| 5,905,248 A | 5/1999 | Russell et al. |
| 5,905,865 A | 5/1999 | Palmer et al. |
| 5,929,849 A | 7/1999 | Kikinis |
| 5,950,173 A | 9/1999 | Perkowski |
| 5,953,005 A | 9/1999 | Liu |
| 5,959,944 A | 9/1999 | Dockes et al. |
| 5,959,945 A | 9/1999 | Kleiman |
| 5,987,454 A | 11/1999 | Hobbs |
| 5,991,798 A | 11/1999 | Ozaki et al. |
| 5,996,000 A | 11/1999 | Shuster |
| 6,005,565 A | 12/1999 | Legall et al. |
| 6,009,410 A | 12/1999 | LeMole et al. |
| 6,011,758 A | 1/2000 | Dockes et al. |
| 6,018,768 A | 1/2000 | Ullman et al. |
| 6,025,837 A | 2/2000 | Matthews, III et al. |
| 6,029,142 A | 2/2000 | Hill |
| 6,031,795 A | 2/2000 | Wehmeyer |
| 6,032,130 A | 2/2000 | Alloul et al. |
| 6,034,925 A * | 3/2000 | Wehmeyer ............... 369/30.28 |
| 6,061,680 A * | 5/2000 | Scherf et al. .................. 707/3 |
| 6,112,240 A | 8/2000 | Pogue et al. |
| 6,128,255 A | 10/2000 | Yankowski |
| 6,128,625 A | 10/2000 | Yankowski |
| 6,138,162 A | 10/2000 | Pistriotto et al. |
| 6,147,940 A | 11/2000 | Yankowski |
| 6,175,857 B1 | 1/2001 | Hachiya et al. |
| 6,189,030 B1 | 2/2001 | Kirsch et al. |
| 6,195,693 B1 | 2/2001 | Berry et al. |
| 6,226,672 B1 | 5/2001 | DeMartin et al. |
| 6,243,725 B1 | 6/2001 | Hempleman et al. |
| 6,247,022 B1 | 6/2001 | Yankowski |
| 6,263,028 B1 | 7/2001 | Nagano |
| 6,263,505 B1 | 7/2001 | Walker et al. |
| 6,272,078 B1 | 8/2001 | Yankowski |
| 6,304,523 B1 | 10/2001 | Jones et al. |
| 6,314,570 B1 | 11/2001 | Tanigawa et al. |
| 6,324,694 B1 | 11/2001 | Watts et al. |
| 6,388,957 B1 | 5/2002 | Yankowski |
| 6,388,958 B1 | 5/2002 | Yankowski |
| 6,434,597 B1 | 8/2002 | Hachiya et al. |
| 6,457,076 B1 | 9/2002 | Cheng et al. |
| 6,496,802 B1 | 12/2002 | Van Zoest et al. |
| 6,505,160 B1 | 1/2003 | Levy et al. |
| 6,535,907 B1 | 3/2003 | Hachiya et al. |
| 6,609,105 B1 | 8/2003 | Van Zoest et al. |
| 6,636,249 B1 | 10/2003 | Rekimoto |
| 6,671,736 B1 | 12/2003 | Virine et al. |

FOREIGN PATENT DOCUMENTS

| | | |
|---|---|---|
| EP | 0 460 869 | 12/1991 |
| EP | 0 814 419 | 12/1997 |
| JP | 10-171818 | 6/1998 |
| WO | 97/05616 | 2/1997 |
| WO | 97/41504 | 11/1997 |
| WO | 98/00788 | 1/1998 |
| WO | 98/02820 | 1/1998 |

OTHER PUBLICATIONS

Sound Recordings Format, OCLC Online Systems, 2nd Edition 1986.

Table of Contents of the Proceedings of the Second Annual ACM Conference on Hypertext, 1989, Printed from The ACM Digital Library, 4 pp.

Table of Contents of the Proceedings of the Third Annual ACM Conference on Hypertext, 1991, Printed from The ACM Digital Library, 5 pages.

Table of Contents of the Proceedings of the ACM Conference on Hypertext, 1992, Printed from The ACM Digital Library, 4 pages.

Table of Contents of the Proceedings of the First ACM International Conference on Multimedia, 1993, Printed from The ACM Digital Library, 6 pages.
Mark Baugher et al., "A Multimedia Client to the IBM LAN Server", Proceedings of the First ACM International Conference on Multimedia, 1993, pp. 105-112.
Naveed U. Qazi et. al., "A Synchronization and Communication Model for Distributed Multimedia Objects", Proceedings of the First ACM International Conference on Multimedia, 1993, pp. 147-155 (1-9).
B. Prabhakaran et al., "Synchronization Models for Multimedia Presentation with User Participation", Proceedings of the First ACM International Conference on Multimedia, 1993, pp. 157-166 (1-12).
T.D.C. Little et al., "A Digital On-Demand Video Service Supporting Content-Based Queries", Proceedings of the First ACM International Conference on Multimedia, 1993, pp. 427-436 (1-9).
Table of Contents of the Proceedings of the 1994 ACM European Conference on Hypermedia Technology, 1994, Printed from The ACM Digital Library, 4 pages.
J. Oikarienen et al., "Internet Relay Chat Protocol", No. 1459, 1993, pp. 1-68.
Table of Contents of the Proceedings of the Fifth ACM Conference on Hypertext, 1993, Printed from The ACM Digital Library, 4 pages.
Yoshitaka Shibata et al., "Dynamic Hypertext and Knowledge Agent Systems for Multimedia Information Networks", Proceedings of the Fifth ACM Conference on Hypertext, 1993, pp. 82-92.
Frank Wm. Tompa et al., "Hypertext by Link-Resolving Components", Proceedings of the Fifth ACM Conference on Hypertext, 1993, pp. 118-130.
Kyoji Hirata et al., "Media-based Navigation for Hypermedia Systems", Proceedings of the Fifth ACM Conference on Hypertext, 1993, pp. 159-173.
Robert M. Akscyn et al., "Design of Hypermedia Script Languages; The KMS Experience", Proceedings of the Fifth ACM Conference on Hypertext, 1993, pp. 268-269.
Table of Contents of the Proceedings of the Second ACM International Conference on Multimedia, 1994, from The ACM Digital Library, 10 pages.
Dragutin Petkovic et al., "Multimedia Databases and Information Systems", Proceedings of the Second ACM International Conference on Multimedia, 1994, p. 67.
Jean-Pierre Courtiat et al., "Towards a New Multimedia Synchronization Mechanism and its Formal Specification", Proceedings of the Second ACM International Conference on Multimedia, 1994, pp. 133-140.
Tat-Seng Chua et al., "Content-based Retrieval of Segmented Images", Proceedings of the Second ACM International Conference on Multimedia, 1994, pp. 211-218.
Steve Scherf, cddb - CD Database Protocol Server, version 1.0, 1996.
Ti Kan, xmcd- Unix CD Player, version 2.0, 1996.
Lian Li et al., "MPEG-2 Coded- and Uncoded-Stream Synchronization Control for Real-time Multimedia Transmission and Presentation over B-ISDN", Proceedings of the Second ACM International Conference on Multimedia, 1994, pp. 239-246.
Shahram Ghandeharizadeh et al., "On Multimedia Repositories, Personal Computers, and Hierarchical Storage Systems", Proceedings of the Second AMC International Conference on Multimedia, 1994, pp. 407-416.
Louis Weitzman, "Automatic Presentation of Multimedia Documents Using Relational Grammars", Proceedings of the Second ACM International Conference on Multimedia, 1994, pp. 443-451.
Michael Mascha et al., "Interactive Education: Transitioning CD-ROMs to the Web", Computer Networks and ISDN Systems, vol. 27, No. 2, 1994, pp. 267-272.
Proposal No. 95-1: Changes to Field 856 (Electronic Location and Access) in the USMARC Bibliographic Format, Library of Congress, Dec. 2, 1994, 13 pages.
Proposal No. 95-8: Define Field 856 (Electronic Location and Access) in the USMARC Classification Format, Library of Congress, May 5, 1995, 2 pages.
ANSI/NISO Z39.50-1995 - Information retrieval (Z39.50): Application Service Definition and Protocol Specification, 1995, pp. i-iv & 1-156.
Table of Contents of the Proceedings of the Third ACM International Conference on Multimedia, 1995, from The ACM Digital Library, 8 pages.
HongJiang Zhang et al., "Video Parsing Retrieval and Browsing: An Integrated and Content-Based Solution", Proceedings of the Third ACM International Conference on Multimedia, 1995, pp. 15-24 (1-19).
Table of Contents of the Proceedings of the Seventh ACM Conference on Hypertext, 1996, Printed from The ACM Digital Library, 4 pages.
Paul H. Lewis et al., "Media-based Navigation with Generic Links", Proceedings of the Seventh ACM Conference on Hypertext, 1996, pp. 215-223.
PURL Frequently Asked Questions, OCLC, Mar. 20, 1996, pp. 1-19.
Z39.50 Implementors Group (ZIG) Meeting Minutes for Apr. 25, 1995, pp. 1-29.
ZIG Meeting Minutes for Sep. 1995, pp. 1-22.
Proposal No. 96-1: Changes to Field 856 (Electronic Location and Access) in the USMARC Formats, Library of Congress, Dec. 1, 1995, 12 pages.
"The Computer Network Unveils Revolutionary Internet Advertising Tools that Allow Custom Banner Ad Delivery Based Demographic Information", CNET Networks, Dec. 6, 1995, pp. 1-3.
BookWhere?for Windows v1.1 - Readme.txt, Sea Change Corporation 1995, pp. 1-3.
GeoPac Management Guide, Release 1.25, Geac Computer Corporation Limited, 1994, pp. 1-1 to 4-24.
Ian S. Graham, The HTML Sourcebook, 1995, pp. 18, 19, 178, 179, 192, 193, 268-277.
Joshua Eddings, How the Internet Works, 1994, pp. 136-147, 158, 159.
John D. Lenk, Lenk's Laser Handbook, McGraw-Hill, Inc. 1992, pp. 2.1-2.13.
Protocol Specification for Internet Protocol - RFC 791, DARPA Internet Program, Sep. 1981, pp. i-iii, 1-45.
Win32 Programmer's Reference vol. 2: Sytem Services, Multimedia Extensions and Application Notes, Microsoft Press, 1993, pp. 517-519, 521-672.
Comer et al, Internetworking with TCP/IP, vol. I: Principles, Protocols and Architecture, Third Ed., 1995, 33 pages.
Comer et al, Internetworking with TCP/IP, vol. Ii: Design, Implementation and Internals, Third Ed., 1995, 342 pages.
Comer et al, Internetworking with TCP/IP, vol. III: Client-Server Programming and Applications, Third Ed., 1995, 265 pages.
Martin Röscheisen et al., "Beyond Browsing; Shared Comments, Soaps, Trails, and On-line Communites", Computer Networks and ISDN Systems, vol. 27, 1994, pp. 739-749.
Table of Contents of the Proceedings of the Fourth ACM International Conference on Multimedia, 1996, from The ACM Digital Library, 7 pages.
Rainer Lienhart, "Automatic Text Recognition for Video Indexing", Proceedings of the Fourth ACM International Conference on Multimedia, 1996, pp. 11-20.
Ketan Mayer-Patel et al., "Synchronization Continuous Media Playback Through the World Wide Web", Proceedings of the Fourth ACM International Conference on Multimedia, 1996, pp. 435-436.
Brian C. Smith et al., "The Berkeley Continuous Media Toolkit", Proceedings of the Fourth ACM International Conference on Multimedia, 1996, pp. 451-452.
Keith Shafer et al., Introduction to Persistent Uniform Resource Locators, Proceeding of INET96, 1996, pp. 1-8.
John Deep et al., Developing CGI Applications with Perl, 1996, pp. 71, 73, 76, 77.
T. Berners-Lee, Hypertext Transfer Protocol - HTTP/1.0 (RFC 1945), Network Working Group, May 1996, pp. 1-60.
BookWhere?for Windows User Guide Manual Version 2.0.4, Sea Change Corporation 1996, pp. 5-36.
BookWhere?for Windows v2.1 - Readme.txt, Sea Change Corporation 1996, pp. 1-7.

BookWhere?for Windows Help v2.0, Sea Change Corporation 1996, 16 pages.

Paul H. Lewis et al., "Content Based Navigation in Multimedia Information Systems", Proceedings of the Fourth ACM International Conference on Multimedia, 1996, pp. 415-416.

Andy Hertzfeld, "User Interface and artistic values", Seminar on People, Computers and Design, Stanford University Program in Human-Computer Interaction, Apr. 15, 1992, printed on Mar, 10, 2005 from hci.stanford.edu/cs547/abstracts/91-92/920415-hertzfeld,html. 1 page.

Denise Caruso, "CD-I Has a Rough Row to Hoe", Digital Media, Jul. 1991; printed on Mar. 10, 2005 from www.Caruso.com/Digital_Media/DM91-07.TXT, pp. 1-13.

Ti Kan, "X M C D version 2.o", BSD News Article 64976, 1996, pp. 1-10.

WorkMan changes as of Release 1.3 (undated, Release 1.2.2a dated May 22, 1994).

David DeRoure et al., "A Multiagent System for Content Based Navigation of Music", Proceedings of the Seventh ACM International Conference on Multimedia, 1999, pp. 63-66.

Proposal No. 97-9: Renaming of subfield 856$u to accommodate URNs, National Digital Library Program, May 1, 1997, pp. 1-6.

Record for DISCID af0f630c from xmcd 1.4 CD database file.

Record for DISCID af0f630c, Revision 1, processed by cddb v1.4b14PL0.

Tim Berners-Lee et al., Weaving the Web, 1999, pp. 188, 189, 211-219.

Richard Seltzer, The AltaVista Search Revolution, Osborne McGraw-Hill, 1997, pp. 7, 8, 215-237.

"Frequently Asked Questions; Troubleshooting ConnecteD", printed on Mar. 10, 2005 from jenniferlopez.com/ConnectedD/faq.html, pp. 1-5.

* cited by examiner

METHOD AND SYSTEM FOR FINDING APPROXIMATE MATCHES IN DATABASE

CROSS-REFERENCE TO RELATED APPLICATIONS

This is a divisional of U.S. patent application Ser. No. 09/820,722 filed Mar. 30, 2001, which is a continuation of U.S. patent application Ser. No. 09/354,166 filed Jul. 16, 1999, now U.S. Pat. No. 6,230,192, which is a divisional of U.S. patent application Ser. No. 08/838,082 filed Apr. 15, 1997, now U.S. Pat. No. 5,987,525, issued on Nov. 16, 1999.

BACKGROUND OF THE INVENTION

1. Field of the Invention

This invention pertains to the field of computer networking, and more particularly to the use of network protocols to provide services to users which are related to audio recordings.

2. Description of the Related Art

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfil this promise.

SUMMARY OF THE INVENTION

It is therefore an object of this invention to provide computer programs, systems, and protocols which allow producers to deliver entertainment complementary to musical recordings by means of on-line services such as the Internet. It is a further object of this invention to provide computer programs, systems, and protocols which allow such complementary entertainment to be meaningfully interactive for the consumer, such that the consumer can also be a creator of the experience.

It is a further object of the invention to achieve the foregoing objects by means of implementations designed to attain integration with existing environments and programs, particularly on the Internet, while retaining the flexibility to adapt to the continuing evolution of standards for on-line services.

In one aspect of the invention, software is provided which permits a computer program running on a remote host to control a compact disc (CD) player, DVD player, or the like on a user's computer. (For convenience, we use the term "CD player" to refer also to DVD players and similar devices.) The software is designed to permit the remote host both to initiate actions on the CD player and to become aware of actions which the user has initiated by other control means, such as the buttons on the CD player's front panel or a different CD player control program. This aspect of the invention is a building-block for the provision of complementary entertainment for musical recordings when those recordings are fixed in the prevailing contemporary form, the audio CD.

In a second aspect of the invention, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect of the invention, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the Rosary Sonatas of Heinrich Ignaz Franz Biber, it would presumably not function well if the CD in the user's player were the soundtrack for the film Mary Poppins. The unique identifier also allows a CD to be used as a key to access a premium Web area. Furthermore, the unique identifier can allow the user to be directed to an area of the Web corresponding to the CD which is in the user's machine.

In a fourth aspect of the invention, the immensely popular on-line service generally referred to as a "chat room" may be enhanced by means of a link to a musical recording to which all persons in the room are listening. The chat room experience as it exists today in online services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by means of shared interests in a particular type of recording.

DETAILED DESCRIPTION OF THE PREFERRED EMBODIMENTS

1. Introduction

The preferred embodiment of this invention operates on the World Wide Web. The software implementation environment provided by the World Wide Web is described in a number of books, for example, John December & Mark Ginsburg, HTML 3.2 and CGI Unleashed (1996). The World Wide Web is based on a network protocol called HTTP (hypertext transfer protocol), which is described in T. Berners-Lee et al., Hypertext Transfer Protocol-HTTP/1.0 (Internet Request for Comments No. 1945, 1996). The HTTP protocol must be run atop a general connection-oriented protocol, which today is generally TCP/IP, described in Douglas E. Comer, Internetworking with TCP/IP (3d ed. 1995). However, the invention described here is not limited to HTTP running over any particular kind of network software or hardware. The principles of the invention apply to other protocols for access to remote information that may come to compete with or supplant HTTP.

Figure 1:
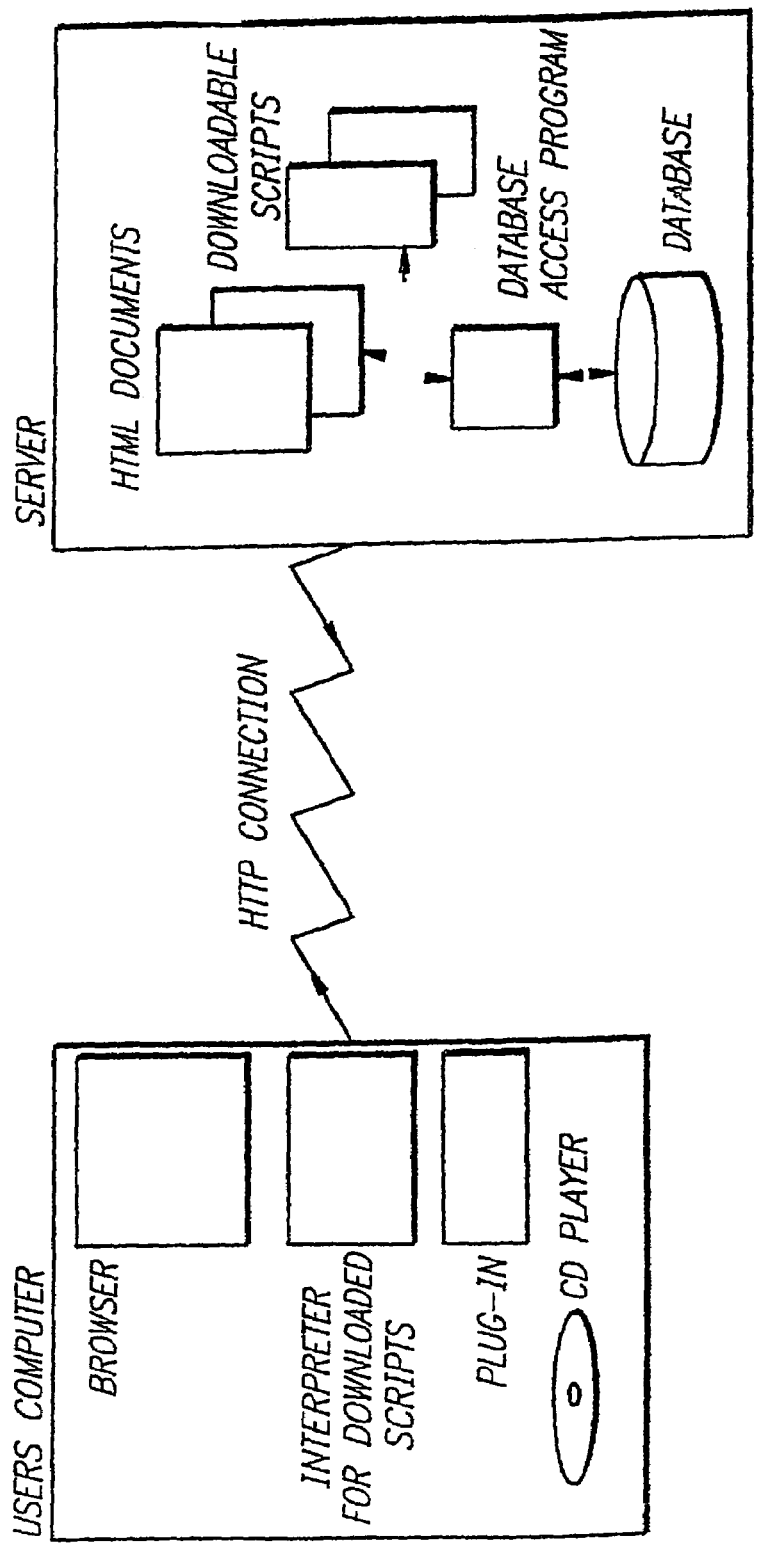
FIG. 1 is a block diagram of the environment in which the preferred embodiment operates.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by means of uniform resource locators (URL's), character strings in a particular format defined in Berners-Lee et al., supra. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the user's prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by means of code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used in connection with the invention is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

2. Command Plug-In

A preferred embodiment of the invention employs a plug-in, referred to as the command plug-in, which provides to a scripting language the ability to command in a detailed fashion the playing of a musical recording. The command plug-in should provide, at a minimum, the following basic functions:

(1) Start and stop play.

(2) Get current track and position within the track.

(3) Seek to a track and a position within the track.

(4) Get and set volume.

(5) Get information regarding the CD (e.g., the number of tracks, their lengths, the pauses between tracks).

(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in Microsoft Win32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write ActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

3. Synchronization

The existence of a command plug-in providing the functions listed above to a scripting language is a foundation on which entertainment complementary to a musical recording may be constructed. In particular, it is possible to devise, building on this foundation, a method for synchronizing the display of visual content by means of the scripting language with the events which are occurring on the audio CD.

In a preferred embodiment of the invention, the synchronization of the visual content to the audio CD proceeds as follows. The visual content is provided by means of a Shockwave animation, which is downloaded from the server and displayed for the user by means of a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by means of the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed, or because the user has fast forwarded the CD.

Figure 2:
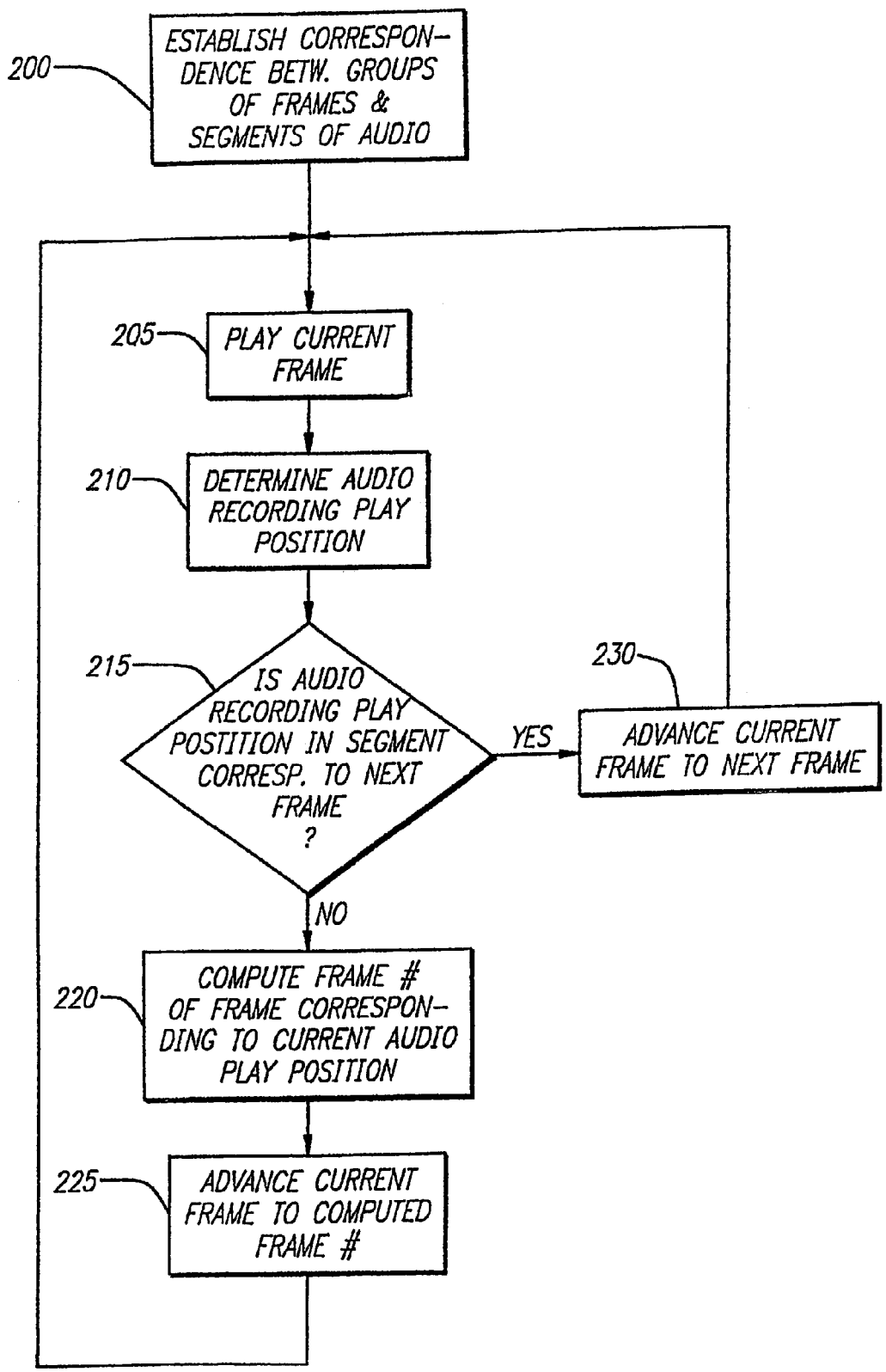
FIG. 2 is a flowchart of the synchronization code of the invention.

In a variant form of this synchronization algorithm (shown in FIG. 2), the frames of the animation are arranged into groups of contiguous frames. A correspondence is established between each such group of frames and a particular segment of the audio recording (box 200 in FIG. 2). At the end of each frame of the animation, the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

4. Unique Identifiers for Audio CDs

A further aspect of the invention is the ability, by making use of the command plug-in, to provide a technique for establishing a unique identifier for an audio CD which is located in the user's CD player. The unique identifier may be based on the number and lengths of the tracks (measured in blocks, i.e., $\frac{1}{75}$ths of a second), so that the identifier would be a concatenation of these lengths. In practice, however, it is desirable to have a somewhat shorter identifier, so the unique identifier is preferably the concatenation of the track lengths expressed in a fairly coarse unit, such as $\frac{1}{4}$th of a second.

Appendix A contains source code, written in C, for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2.\sup.8=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Appendix B contains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier of the invention is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives a URL, and (iii) the browser does an HITP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by means of a script which invokes the functions provided by the command plug-in and computes a unique identifier.

5. Chat Rooms Connected With Musical Recordings

A third aspect of the invention is the connection of chat rooms with musical recordings. The goal is to provide all participants in a chat room with the same music at approximately the same time.

The prevailing network protocol for chat services is Interney Relay Chat (IRC), described J. Oikarinen & D. Reed, Internet Relay Chat Protocol (Internet Request for Comments No. 1459, 1993). In this protocol, when one becomes a client of a chat server, one sends the name of a chat room. The chat server receives messages from all of its of clients and relays the messages sent in by one client to all the other clients connected in the same room as that client. The messages which a client sends are typically typed in by the user who is running the client, and the messages which a client receives are typically displayed for the user who is running the client to read.

Figure 3:
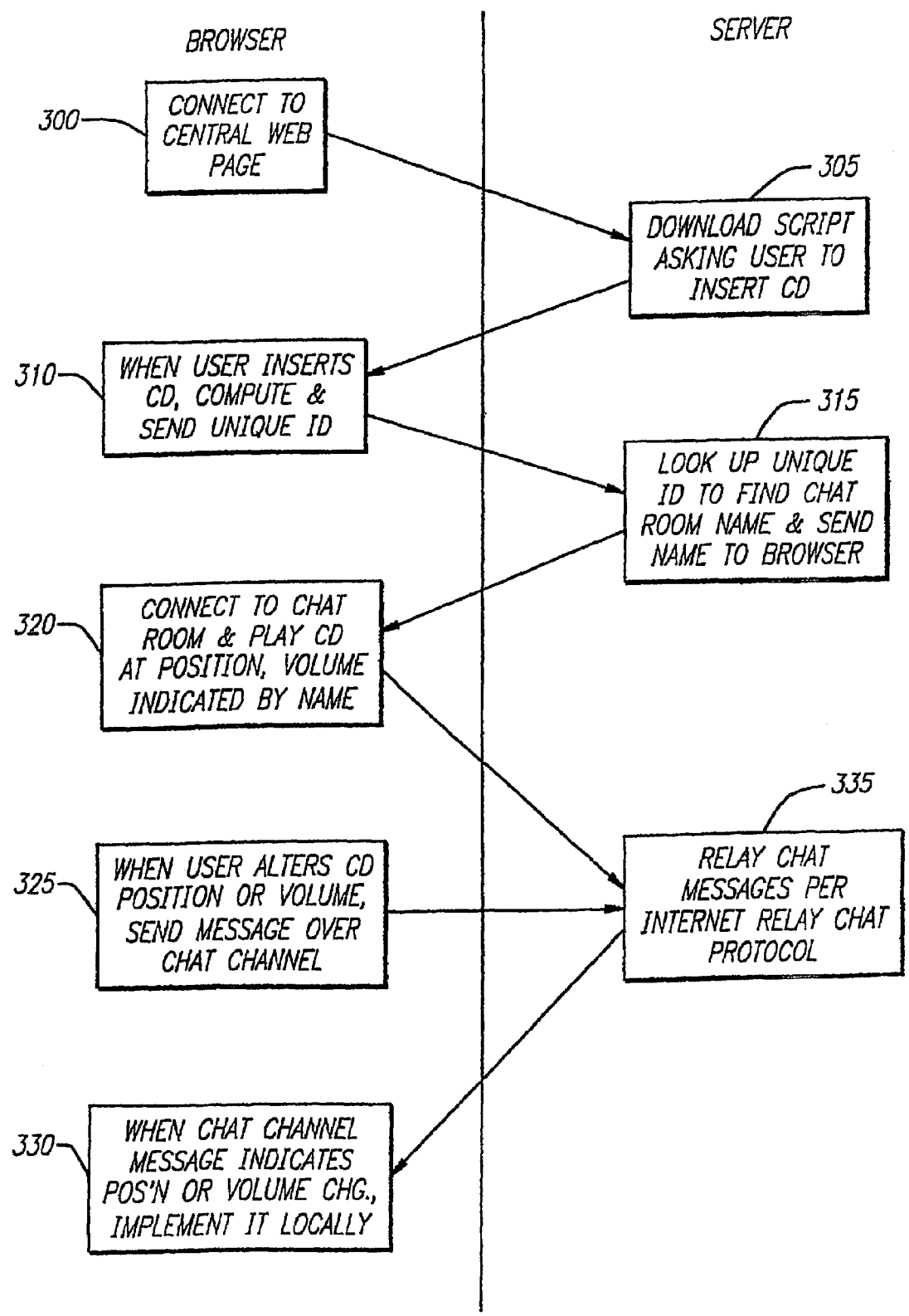
FIG. 3 is a flowchart of the sequence of operations for connection to a chat room focused on a musical recording.

In a preferred embodiment of the invention, a chat client is customized by means of a plug-in, which we will call the chat plug-in. The chat client is started up by a browser as follows (see FIG. 3). The user connects by means of the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's. computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect of the invention, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect of the invention the messages delivered to the users of a chat can be driven from a text file rather than manual typing. This would allow a pre-recorded experience to be played back for a group of chat users. Such a technique may be used to create a prerecorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-in and in the central Web page, with its connection to a database of CD information.

APPENDIX A

```
/*
 * FUZZY CD ID
 * (c) 1996 ION
 *
 *
 * by Ty Roberts
 */
#include <stdio.h>
#include <stdlib.h>
#include <time.h>
struct fuzzyCDid {
    short   numTracks; // start time in milliseconds
    unsigned short fuzzlength[100];
};
typedef struct fuzzyCDid fuzzyCDid, *fuzzyCDidPtr;
// structure of a cd track with all times stored in milliseconds
struct cdtrack {
    long beginMs;  // start time in milliseconds
    long endMs;    // end time in milliseconds
    long lengthMs; // length in milliseconds
};
typedef struct cdtrack cdtrack, *cdTrackPtr;
```

```
struct cd {
    short numTracks;
    cdtrack   track[100];
};
typedef struct cd cd, *cdPtr;
void CreateFuzzyId( fuzzyCDidPtr fid, cdPtr cd );
float FuzzyMatch( fuzzyCDidPtr fid1, fuzzyCDidPtr fid2 );
// SUBROUTINES
void CreateFuzzyId( fuzzyCDidPtr fid, cdPtr cd )
{
    long  i;
    // first copy in the number of tracks
    fid->numTracks = cd->numTracks;
    for(i=0;i<fid->numTracks;i++) {
        // shift left and create a MSB length thats not exact
        fid->fuzzlength[i] = (short)(cd->track[i].lengthMs>>8);
    }
}
float FuzzyMatch( fuzzyCDidPtr fid1, fuzzyCDidPtr fid2)
{
    long   fidmatcherr. = 0, fidmatchtotal = 0;
    short  i, trackcnt;
    float  matchpercent;
    // find the larger number of tracks
    trackcnt = fid1->numTracks<fid2->numTracks ? fid2->numTracks : fid1->numTracks;
    // cycle thru the tracks accumulating error and total comparedtimes
    for(i=0;i<trackcnt;i++) {
        if ((i < fid1->numTracks) && (i < fid2->numTracks)) {
            fidmatcherr += abs(fid1->fuzzlength[i]-fid2->fuzzlength[i]);
            fidmatchtotal += fid1->fuzzlength[i];
        } else if (i >= fid2->numTracks) {
            fidmatcherr += fid1->fuzzlength[i];
            fidmatchtotal += fid1->fuzzlength[i];
```

```c
    } else if (i >= fid1->numTracks) {
        fidmatcherr += fid2->fuzzlength[i];
        fidmatchtotal += fid2->fuzzlength[i];
    }
  }
  if (fidmatcherr > 0) {
     matchpercent = 100 -
(((float)fidmatcherr/(float)fidmatchtotal)*100);
  } else {
     matchpercent = 100;
  }
  return matchpercent;
}
void main(void)
{
   short i;
   float matchpercent;
   // create global structures for two complete cds with up to 100 tracks
   cd cd2id;
   fuzzyCDid fidcd2id;
   cd cdFromDB;
   fuzzyCDid fidcdFromDB;
   printf ("Test #1 will compare two CDs that are exactly the same.backslash.n.backslash.n");
   // put in some test values for the cd track lengths
   // since these are in ms, its basically 60000 = 1 minute
   cd2id.track[0].lengthMs = 121323;
   cd2id.track[1].lengthMs = 234565;
   cd2id.track[2].lengthMs = 566437;
   cd2id.track[3].lengthMs = 245120;
   cd2id.track[4].lengthMs = 20000;
   cd2id:track[5].lengthMs = 120386;
   cd2id.track[6].lengthMs = 323453;
   cd2id.numTracks = 7;
```

```
for(i=1;i<cd2id.numTracks;i++) {
    printf ("CD #1: Track = %d length in minutes = %f.backslash.n",
        i, (float)cd2id.track[i].lengthMs/60000.0);
}
printf(".backslash.n");
cdFromDB.track[0].lengthMs = 121323;
cdFromDB.track[1].lengthMs = 234565;
cdFromDB.track[2].lengthMs = 566437;
cdFromDB.track[3].lengthMs = 245120;
cdFromDB.track[4].lengthMs = 20000;
cdFromDB.track[5].lengthMs = 120386;
cdFromDB.track[6].lengthMs = 323453;
cdFromDB.numTracks = 7;
for(i=1;i<cdFromDB.numTracks;i++) {
    printf ("CD #2: Track = %d length in minutes = %f.backslash.n",
        i, (float)cdFromDB.track[i].lengthMs/60000.0);
}
CreateFuzzyId( &fidcd2id, &cd2id );
CreateFuzzyId( &fidcdFromDB, &cdFromDB );
matchpercent = FuzzyMatch( &fidcd2id, &fidcdFromDB);
printf ("The cd's matchpercent was computed as=%f", matchpercent);
printf (".backslash.n");
printf (".backslash.n");
printf ("Test #2 will compare two cd that are nearly the
same.backslash.nexcept they have
diffent # of tracks .backslash.n");
// put in some test values for the cd track lengths
// since these are in ms, its basically 60000 = 1 minute
cd2id.track[0].lengthMs = 121323;
cd2id.track[1].lengthMs = 234565;
cd2id.track[2].lengthMs = 566437;
cd2id.track[3].lengthMs = 245120;
cd2id.track[4].lengthMs = 20000;
cd2id.track[5].lengthMs = 120386;
```

```
cd2id.track[6].lengthMs = 323453;
cd2id.numTracks = 7;
for(i=1;i<cd2id.numTracks;i++) {
    printf ("CD #1: Track = %d length in minutes = %f.backslash.n",
        i, (float)cd2id.track[i].lengthMs/60000.0);
}
printf (".backslash.n");
cdFromDB.track[0].lengthMs = 121323;
cdFromDB.track[1].lengthMs = 234565;
cdFromDB.track[2].lengthMs = 566437;
cdFromDB.track[3].lengthMs = 245120;
cdFromDB.track[4].lengthMs = 20000;
cdFromDB.track[5].lengthMs = 120386;
cdFromDB.numTracks = 6;
for(i=1;i<cdFromDB.numTracks;i++) {
    printf ("CD #2: Track = %d length in minutes = %f.backslash.n",
        i, (float)cdFromDB.track[i].lengthMs/60000.0);
}
CreateFuzzyId( &fidcd2id, &cd2id );
CreateFuzzyId( &fidcdFromDB, &cdFromDB );
matchpercent = FuzzyMatch( &fidcd2id, &fidcdFromDB);
printf ("The cd's matchpercent was computed as=%f",matchpercent);
printf (".backslash.n");
printf (".backslash.n");
printf ("Test #3 will compare two cd that are not the
same.backslash.n.backslash.n");
// put in some test values for the cd track lengths
// since these are in ms, its basically 60000 = 1 minute
cd2id.track[0].lengthMs = 34213;
cd2id.track[1].lengthMs = 334565,
cd2id.track[2].lengthMs = 231423;
cd2id.track[3].lengthMs = 134122;
cd2id.track[4].lengthMs = 2342;
cd2id.track[5].lengthMs = 3487;
```

```
    cd2id.track[6].lengthMs = 9976;
    cd2id.numTracks = 7;
    for(i=1;i<cd2id.numTracks;i++) {
       printf ("CD #1: Track = %d length in minutes = %f.backslash.n",
           i, (float)cd2id.track[i].lengthMs/60000.0);
    }
    printf (".backslash.n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.track[6].lengthMs = 323453;
    cdFromDB.numTracks = 6;
    for(i=1;i<cdFromDB.numTracks;i++) {
       printf ("CD #2: Track = %d length in minutes = %f.backslash.n",
           i, (float)cdFromDB.track[i].lengthMs/60000.0);
    }
    CreateFuzzyId( &fidcd2id, &cd2id);
    CreateFuzzyId( &fidcdFromDB, &cdFromDB);
    matchpercent = FuzzyMatch( &fidcd2id, &fidcdFromDB);
    printf ("The cd's matchpercent was computed as=%f",matchpercent);
}
```

APPENDIX B

```
/*
 * EXACT MATCH CD ID
 * - 1996 ION
 *
 *
 * by Ty Roberts
 */
#include <stdio.h>
#include <stdlib.h>
```

```
#include <time.h>
struct cdid{
    long id[2];
};
typedef struct cdid cdid, *cdidPtr;
// structure of a cd track with all times stored in milliseconds
struct cdtrack{
    long beginMs; // start time in miliseconds
    long endMs;   // end time in milliseconds
    long lengthMs; //length in Miliseconds
};
typedef struct cdtrack cdtrack, *cdTrackPtr;
struct cd {
    short numTracks;
    cdtrack   track[100];
};
typedef struct cd cd, *cdPtr;
void CreateUniqueId( cdidPtr cid, cdPtr cd );
// SUBROUTINES
void CreateUniqueId( cdidPtr cid, cdPtr cd )
{
    long     i, t, n;
    t = 0;
    n = 0;
    for(i=0;i<cd->numTracks;i++) {
    // shift left and create a MSB length thats not exact
    t +=cd->track[i].lengthMs;
    n +=cd->track[i].beginMs + cd->track[i].endMs;
    }
    cid->id[0] = t<<10+cd->numTracks;
    cid->id[1] = n;
}
void main(void)
{
```

```
short i;
short matchtest;
// create global structures for two complete cds with up to 100
tracks
cd   cd2id;
cdid cd2UID;
cd   cdFromDB;
cdid cdFromDBUID;
printf ("Test #1 will compare two cd that are exactly the
same.backslash.n.backslash.n");
// put in some test values for the cd track lengths
// since thes are in ms, its basically 60000 = 1 minute
cd2id.track[0].beginMs = 0;
cd2id.track[1].beginMs = 100001;
cd2id.track[2].beginMs = 231001;
cd2id.track[3].beginMs = 345001;
cd2id.track[4].beginMs = 435001;
cd2id.track[5].beginMs = 460001;
cd2id.track[6].beginMs = 590001;
cd2id.track[0].endMs = 100000;
cd2id.track[1].endMs = 231000;
cd2id.track[2].endMs = 345000;
cd2id.track[3].endMs = 435000;
cd2id.track[4].endMs = 460000;
cd2id.track[5].endMs = 590000;
cd2id.track[6].endMs = 690000;
cd2id.track[0].lengthMs =
cd2id.track[0].endMs - cd2id.track[0].beginMs;
cd2id.track[1].lengthMs =
cd2id.track[1].endMs - cd2id.track[1].beginMs;
cd2id.track[2].lengthMs =
cd2id.track[2].endMs - cd2id.track[2].beginMs;
cd2id.track[3].lengthMs =
cd2id.track[3].endMs - cd2id.track[3].beginMs;
```

```
cd2id.track[4].lengthMs =
cd2id.track[4].endMs - cd2id.track[4].beginMs;
cd2id.track[5].lengthMs =
cd2id.track[5].endMs - cd2id.track[5].beginMs;
cd2id.track[6].lengthMs =
cd2id.track[6].endMs - cd2id.track[6].beginMs;
cd2id.numTracks = 7;
for(i=1;i<cd2id.numTracks;i++) {
    printf ("CD #1: Track = %d length inminutes = %f.backslash.n", i,
(float)cd2id.track[i].lengthMs/60000.0);
}
printf (".backslash.n");
cdFromDB.track[0].beginMs = 0;
cdFromDB.track[1].beginMs = 100001;
cdFromDB.track[2].beginMs = 231001;
cdFromDB.track[3].beginMs = 345001;
cdFromDB.track[4].beginMs = 435001;
cdFromDB.track[5].beginMs = 460001;
cdFromDB.track[6].beginMs = 590001;
cdFromDB.track[0].endMs = 100000;
cdFromDB.track[1].endMs = 231000;
cdFromDB.track[2].endMs = 345000;
cdFromDB.track[3].endMs = 435000;
cdFromDB.track[4].endMs = 460000;
cdFromDB.track[5].endMs = 590000;
cdFromDB.track[6].endMs = 690000;
cdFromDB.track[0].lengthMs =
cd2id.track[0].endMs - cd2id.track[0].beginMs;
cdFromDB.track[1].lengthMs =
cd2id.track[1].endMs - cd2id.track[1].beginMs;
cdFromDB.track[2].lengthMs =
cd2id.track[2].endMs - cd2id.track[2].beginMs;
cdFromDB.track[3].lengthMs =
cd2id.track[3].endMs - cd2id.track[3].beginMs;
```

```
    cdFromDB.track[4].lengthMs =
    cd2id.track[4].endMs - cd2id.track[4].beginMs;
    cdFromDB.track[5].lengthMs =
    cd2id.track[5].endMs - cd2id.track[5].beginMs;
    cdFromDB.track[6].lengthMs =
    cd2id.track[6].endMs - cd2id.track[6].beginMs;
    cdFromDB.numTracks = 7;
    for(i=1;i<cdFromDB.numTracks;i++) {
     printf ("CD #2: Track = %d  length inminutes = %f.backslash.n", i,
(float)cdFromDB.track[i].lengthMs/60000.0);
    }
    CreateUniqueId( &cd2UID, &cd2id );
    printf( "Unique ID for CD #1 = %d%d.backslash.n",
    cd2UID.id[0], cd2UID.id[1]);
    CreateUniqueId( &cdFromDBUID, &cdFromDB );
    printf( "Unique ID for CD #2 = %d%d.backslash.n",
    cdFromDBUID.id[0],
cdFromDBUID.id[1]);
    matchtest = (cd2UID.id[0] == cdFromDBUID.id[0])
     && (cd2UID.id[1] ==
cdFromDBUID.id[1]);
    printf ("The cd's match if result is non zero matchresult=
    %d",matchtest);
    printf (".backslash.n");
    printf (".backslash.n");
    printf ("Test #2 will compare two cd that are
nearly the same.backslash.nexcept they have diffent # of tracks
.backslash.n");
     // put in some test values for the cd track lengths
     // since thes are in ms, its basically 60000 = 1 minute
    cd2id.track[0].beginMs = 0;
    cd2id.track[1].beginMs = 100001;
    cd2id.track[2].beginMs = 231001;
    cd2id.track[3].beginMs = 345001;
```

```
cd2id.track[4].beginMs = 435001;
cd2id.track[5].beginMs = 460001;
cd2id.track[6].beginMs = 590001;
cd2id.track[0].endMs = 100000;
cd2id.track[1].endMs = 231000;
cd2id.track[2].endMs = 345000;
cd2id.track[3].endMs = 435000;
cd2id.track[4].endMs = 460000;
cd2id.track[5].endMs = 590000;
cd2id.track[6].endMs = 690000;
cd2id.track[0].lengthMs =
cd2id.track[0].endMs - cd2id.track[0].beginMs;
cd2id.track[1].lengthMs =
cd2id.track[1].endMs - cd2id.track[1].beginMs;
cd2id.track[2].lengthMs =
cd2id.track[2].endMs - cd2id.track[2].beginMs;
cd2id.track[3].lengthMs =
cd2id.track[3].endMs - cd2id.track[3].beginMs;
cd2id.track[4].lengthMs =
cd2id.track[4].endMs - cd2id.track[4].beginMs;
cd2id.track[5].lengthMs =
cd2id.track[5].endMs - cd2id.track[5].beginMs;
cd2id.track[6].lengthMs =
cd2id.track[6].endMs - cd2id.track[6].beginMs;
cd2id.numTracks = 7;
for(i=1;i<cd2id.numTracks;i++) {
    printf ("CD #1: Track = %d length inminutes = %f.backslash.n", i,
(float)cd2id.track[i].lengthMs/60000.0);
}
printf (".backslash.n");
cdFromDB.track[0].beginMs = 0;
cdFromDB.track[1].beginMs = 100001;
cdFromDB.track[2].beginMs = 231001;
cdFromDB.track[3].beginMs = 345001;
```

```
cdFromDB.track[4].beginMs = 435001;
cdFromDB.track[5].beginMs = 460001;
cdFromDB.track[6].beginMs = 590001;
cdFromDB.track[0].endMs = 100000;
cdFromDB.track[1].endMs = 231000;
cdFromDB.track[2].endMs = 345000;
cdFromDB.track[3].endMs = 435000;
cdFromDB.track[4].endMs = 460000;
cdFromDB.track[5].endMs = 590000;
cdFromDB.track[0].lengthMs =
cd2id.track[0].endMs - cd2id.track[0].beginMs;
cdFromDB.track[1].lengthMs =
cd2id.track[1].endMs - cd2id.track[1].beginMs;
cdFromDB.track[2].lengthMs =
cd2id.track[2].endMs - cd2id.track[2].beginMs;
cdFromDB.track[3].lengthMs =
cd2id.track[3].endMs - cd2id.track[3].beginMs;
cdFromDB.track[4].lengthMs =
cd2id.track[4].endMs - cd2id.track[4].beginMs;
cdFromDB.track[5].lengthMs =
cd2id.track[5].endMs - cd2id.track[5].beginMs;
cdFromDB.numTracks = 6;
for(i=1;i<cdFromDB.numTracks;i++) {
    printf ("CD #2: Track = %d length inminutes = %f.backslash.n",i,
(float)cdFromDB.track[i].lengthMs/60000.0 );
}
CreateUniqueId( &cd2UID, &cd2id );
printf( "Unique ID for CD #1 = %d%d.backslash.n",
    cd2UID.id[0], cd2UID.id[1] );
CreateUniqueId( &cdFromDBUID, &cdFromDB );
printf( "Unique ID for CD #2 = %d%d.backslash.n",
    cdFromDBUID.id[0],
cdFromDBUID.id[1] );
    matchtest = (cd2UID.id[0] == cdFromDBUID.id[0])
```

```
        && (cd2UID.id[l] ==
cdFromDBUID.id[1]);
        printf ("The cd's match if result is non zero matchresult=
        %d",matchtest);
        printf (".backslash.n");
        printf (".backslash.n");
}
```

What is claimed is:

1. A method of searching for a match in a database of records, each record including an identifier that is at least substantially unique, and length information and number of segments of a recording corresponding to the record, said method comprising:
obtaining approximate length information for recordings corresponding to the records in the database and for a selected recording having a number of segments; and
determining at least one value indicating closeness of a match between a selected recording and at least one record in the database based on the number of segments and the approximate length information.

2. A method as recited in claim 1,
wherein the length information for the records in the database and for the selected recording includes information indicating the length of each segment individually, and
wherein said determining includes comparing the length of corresponding segments in the selected recording and the recording corresponding to each approximately matching record.

3. A method as recited in claim 2, wherein said determining does not require the number of segments to be identical and includes obtaining at least one value indicative of a difference in length between corresponding segments of the selected recording and the recording corresponding to each approximately matching record.

4. A method as recited in claim 3, wherein said obtaining includes
calculating a total length based on at least one of the selected recording and the recording corresponding to each approximately matching record;
calculating accumulated differences in length between corresponding segments of the selected recording and the recording corresponding to each approximately matching record; and
comparing a ratio of the total length to the accumulated differences in length to a predetermined value in determining each approximately matching record.

5. A method as recited in claim 2, further comprising receiving a query to search for a match between the selected recording and the records in the database, the query including the number of segments and the length information for the selected recording.

6. A method as recited in claim 5, wherein the recordings corresponding to the records in the database and the selected recording each contains at least an audio portion and the number of segments are the number of tracks in the audio portion.

7. A method as recited in claim 6, wherein the recordings are compact discs.

8. A method as recited in claim 5, wherein the recordings are digital versatile discs.

9. A method as recited in claim 5,
wherein the selected recording is played at a first location, and
wherein said method further comprises:
generating the query by a computer at the first location where the selected recording is being played; and
sending the query to a server at a second location, remote from the first location, where the database is stored.

10. A method as recited in claim 9, further comprising sending from the server to the computer additional information stored in the at least one approximately matching record and not included in the selected recording.

11. A method as recited in claim 2, wherein the recordings corresponding to the records in the database and the selected recording each contains at least an audio portion and the number of segments are the number of tracks in the audio portion.

12. A method as recited in claim 11, wherein the recordings are compact discs.

13. A method as recited in claim 11, wherein the recordings are digital versatile discs.

14. A method as recited in claim 1,
wherein the length information for the records in the database and for the selected recording includes information indicating the length of each mutually exclusive segment, and
wherein said determining includes comparing the length of corresponding segments in the selected recording and the recording corresponding to each approximately matching record.

15. A method as recited in claim 1,
wherein the at least one record includes at least two records, and
further comprising outputting the at least two records sorted based on the closeness of the match with the selected recording.

16. A method as recited in claim 15, further comprising:
sending, from a client device to a server over a network, a request for one of the records in the database matching the selected recording;
performing said determining in the server in response to the request;
receiving, by the client device as a response to the request, at least a portion of the at least two records for said outputting to be performed at the client device.

17. A database system, comprising:
a storage unit storing a database of records, each record including an identifier that is at least substantially unique, and length information and number of segments in a recording corresponding to the record; and
a processing unit, coupled to said storage unit, programmed to obtain approximate length information for recordings corresponding to the records in the database and for a selected recording having a number of segments, and to determine at least one value indicating closeness of a match between a selected recording and at least one record in the database based on the number of segments and the approximate length information.

18. A database system as recited in claim 17,
wherein the length information for the records in the database and for the selected recording includes information indicating the length of each segment individually, and
wherein said processing unit compares the length of corresponding segments in the selected recording and the recording corresponding to each approximately matching record in the database.

19. A database system as recited in claim 18, wherein said processing unit does not require the number of segments to be identical in the selected recording and the at least one approximately matching record, and obtains at least one value indicative of a difference in length between corresponding segments of the selected recording and the at least one approximately matching record in the database.

20. A database system as recited in claim 17,
wherein the length information for the records in the database and for the selected recording includes information indicating the length of each mutually exclusive segment, and wherein said processing unit compares the length of corresponding segments in the selected recording and the recording corresponding to each approximately matching record in the database.

21. A database system as recited in claim 17, further comprising a communication unit, coupled to said storage unit, to receive a query to search for a match between the selected recording and the records in the database, the query including the number of segments and the length information for the selected recording.

22. A database system as recited in claim 21, wherein the recordings corresponding to the records in the database and the selected recording each contains at least an audio portion and the number of segments are the number of tracks in the audio portion.

23. A database system as recited in claim 22, wherein the recordings are compact discs.

24. A database system as recited in claim 21, wherein the recordings are digital versatile discs.

25. A database system as recited in claim 21,
wherein said processing unit, storage unit and communication unit are at a first location, and
wherein said database system further comprises:
a computer at a second location, remote from the first location, to generate the query and play the selected recording; and
a communication network at least temporarily coupling said computer and said communication unit to send the query from said computer to said communication unit.

26. A database system as recited in claim 25, wherein said communication unit sends to the computer via said communication network additional information stored in the at least one approximately matching record and not included in the selected recording.

27. A database system as recited in claim 17, wherein the recordings corresponding to the records in the database and the selected recording each contains at least an audio portion and the number of segments are the number of tracks in the audio portion.

28. A database system as recited in claim 27, wherein the recordings are compact discs.

29. A database system as recited in claim 17, wherein the recordings are digital versatile discs.

30. A database system as recited in claim 17,
wherein the at least one record includes at least two records, and
wherein said processing unit further outputs at least a portion of the at least two records and, for each record output, the value indicating closeness of the match, so that the at least two records can sorted based on the closeness of the match with the selected recording.

31. A database system as recited in claim 30,
wherein said database system is connected to client devices via a network,
wherein said database system further comprises at least one input/output unit, receiving from one of the client devices via the network, a request for one of the records in the database matching the selected recording,
wherein said processing unit determines the at least two values in response to the request and sends to the client device via said at least one input/output unit, as a response to the request, at least a portion of the at least two records for outputting at the client device.

32. At least one computer program stored on a computer-readable medium, embodying a method of searching for a match in a database of a plurality of records, each record including an identifier that is at least substantially unique, and length information and number of segments in a recording corresponding to the record, comprising:
obtaining approximate length information for recordings corresponding to the records in the database and for a selected recording having a number of segments; and
determining at least one value indicating closeness of a match between a selected recording and at least one record in the database based on the number of segments and the approximate length information.

33. At least one computer program as recited in claim 32,
wherein the length information for the records in the database and for the selected recording includes information indicating the length of each segment individually, and
wherein said determining includes comparing the length of corresponding segments in the selected recording and the recording corresponding to each approximately matching record in the database.

34. At least one computer program as recited in claim 33, wherein said determining does not require the number of segments to be identical and obtains at least one value indicative of a difference in length between corresponding segments of the selected recording and the recording corresponding to each approximately matching record in the database.

35. At least one computer program as recited in claim 34, wherein said obtaining includes
calculating a total length based on at least one of the selected recording and the recording corresponding to each approximately matching record;
calculating accumulated differences in length between corresponding segments of the selected recording and the recording corresponding to each approximately matching record; and
comparing a ratio of the total length to the accumulated differences in length to a predetermined value in determining each approximately matching record.

36. At least one computer program as recited in claim 33, further comprising receiving a query to search for a match between the selected recording and the records in the database, the query including the number of segments and the length information for the selected recording.

37. At least one computer program as recited in claim 36, wherein the recordings corresponding to the records in the database and the selected recording each contains at least an audio portion and the number of segments are the number of tracks in the audio portion.

38. At least one computer program as recited in claim 37, wherein the recordings are compact discs.

39. At least one computer program as recited in claim 36, wherein the recordings are digital versatile discs.

40. At least one computer program as recited in claim 36,
wherein the selected recording is played at a first location, and
wherein said method further comprises:
generating the query by a computer at the first location where the selected recording is being played; and
sending the query to a server at a second location, remote from the first location, where the database is stored.

41. At least one computer program as recited in claim 40, further comprising sending from the server to the computer additional information stored in the at least one approximately matching record and not included in the selected recording.

42. At least one computer program as recited in claim 33, wherein the recordings corresponding to the records in the database and the selected recording each contains at least an audio portion and the number of segments are the number of tracks in the audio portion.

43. At least one computer program as recited in claim 42, wherein the recordings are compact discs.

44. At least one computer program as recited in claim 33, wherein the recordings are digital versatile discs.

45. At least one computer program as recited in claim 32,
wherein the length information for the records in the database and for the selected recording includes information indicating the length of each mutually exclusive segment, and
wherein said determining includes comparing the length of corresponding segments in the selected recording and the recording corresponding to each approximately matching record in the database.

46. At least one computer program as recited in claim 32,
wherein the at least one record includes at least two records, and
further comprising outputting the at least two records sorted based on the closeness of the match with the selected recording.

47. At least one computer program as recited in claim 46, further comprising:
sending, from a client device to a server over a network, a request for one of the records in the database matching the selected recording;
performing said determining in the server in response to the request;
receiving, by the client device as a response to the request, at least a portion of the at least two records for said outputting to be performed at the client device.

* * * * *